United States Patent [19]
Landais

[11] Patent Number: 5,463,933
[45] Date of Patent: Nov. 7, 1995

[54] DEVICE FOR LOCKING A FILTER CARRIER ON AN INFUSION HEAD OF AN ESPRESSO COFFEEMAKER

[75] Inventor: Joel Landais, Conde Sur Sarthe, France

[73] Assignee: Moulinex S.A., Bagnolet, France

[21] Appl. No.: 235,702

[22] Filed: Apr. 29, 1994

[30] Foreign Application Priority Data

Apr. 29, 1993 [FR] France .................... 93/05107

[51] Int. Cl.$^6$ .................... A47J 31/14; A47J 31/30
[52] U.S. Cl. .................... 99/285; 99/295
[58] Field of Search .................... 99/285, 295, 279, 99/302 R; 426/433

[56] References Cited

U.S. PATENT DOCUMENTS 4,787,299  11/1988  Levi .................... 99/295

FOREIGN PATENT DOCUMENTS 0280594  8/1988  European Pat. Off. ..
0313496  4/1989  European Pat. Off. ..
3736517  11/1988  Germany .

Primary Examiner—Robert W. Jenkins
Attorney, Agent, or Firm—Young & Thompson

[57] ABSTRACT

A device for locking a filter carrier on an infusion head (1) of a coffeemaker provided with a locking ramp (2) and adapted to receive a filter carrier (3) which comprises to this end securement structure (4) to the head (1), such that the filter carrier (3) may be engaged in the head (1) and be brought, by a movement of rotation, from a free position to a locked position. The locking device comprises structure for signaling the passage from the free position to the locked position. The signal can be audible or visual, generated mechanically, electroacoustically or optoelectronically. The invention is applicable to coffeemakers of the espresso type.

7 Claims, 2 Drawing Sheets

DEVICE FOR LOCKING A FILTER CARRIER ON AN INFUSION HEAD OF AN ESPRESSO COFFEEMAKER

FIELD OF THE INVENTION

The present invention relates to a device for locking a filter carrier on an infusion head of a coffeemaker of the espresso type provided with a locking ramp and adapted to receive in sealed fashion the filter carrier which comprises to this end means for securement of said head, such that said filter carrier can be engaged within the head and be brought by a rotative movement from a free position to a locked position.

BACKGROUND OF THE INVENTION

One of the problems generally encountered by the user of coffeemakers comprising such a filter carrier is correctly positioning this member before operating the coffeemaker.

If the filter carrier is not well locked, the seal between the filter and the infusion head is imperfect and the pressure necessary to obtain espresso coffee cannot be achieved.

On the other hand, when the user emplaces the filter carrier with too much force, there is the risk of prematurely damaging the sealing elements.

THE SUMMARY OF THE INVENTION

The object of the present invention is to permit the user to position correctly the filter carrier.

According to the invention, the locking device comprises means for indicating the passage from the free position to the locked position.

Thus the user is informed of the correct positioning of the filter carrier.

BRIEF DESCRIPTION OF THE DRAWINGS

The characteristics and advantages of the invention will become apparent from the description which follows, given by way of nonlimiting example, with reference to the accompanying drawings, in which.

DETAILED DESCRIPTION OF THE INVENTION

Figure 1:
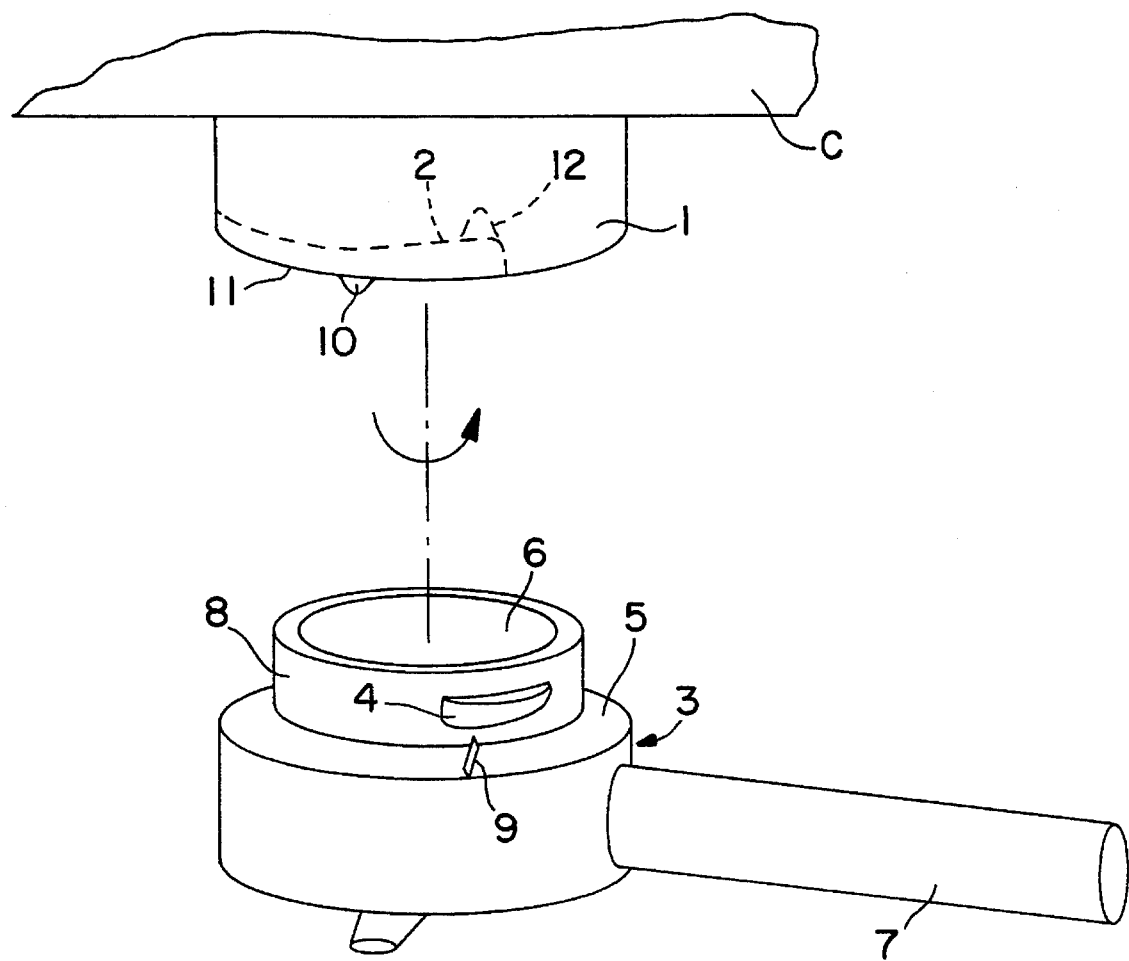
FIG. 1 is a perspective view of the head and of the filter carrier showing a locking device according to the invention.

FIG. 1 shows the locking device for a filter carrier on the infusion head 1 of a coffeemaker of the espresso type provided with a locking ramp 2 and adapted to receive the filter carrier 3 which comprises for this purpose securement means 4 to said head 1, such that said filter carrier 3 can be engaged in the head 1 and be brought, by a movement of rotation, from a free position to a locked position.

The filter carrier comprises an envelope 5 surrounding an infusion chamber 6 provided with a filter adapted to contain ground coffee. It also comprises a handle 7 so as to facilitate its gripping The user fills the filter with ground coffee and secures the filter carrier 3 to the infusion head 1 of the coffeemaker C by introducing the upper portion 8 of the filter carrier 3 into the head 1 and by imposing on the filter carrier 3 a movement of rotation by means of the handle 7 so as to lock it. To this end, the securement means 4 of the filtar carrier 3 are constituted by two diametrically opposed lugs engaging the ramp 2.

According to the invention, the locking device comprises means for indicating the passage from the free position to the locked position. Thanks to these means, the user knows when the filter carrier is in locked position and avoids too great clamping of it on the ramp.

In a first modification, the indicating means are sonic. According to FIG. 1 and 2, the sonic indicating means comprise a flexible blade 9 and a projection 10 coacting with said blade 9 so as to bend the blade 9 and let it recover abruptly when the filter carrier reaches the locked position. The blade 9 then emits a snapping sound. When reverse rotative movement is imparted to the filter carrier to as to detach it from the ramp, the flexible blade is also actuated by the projection 10 and again emits a noise indicating unlocking.

Preferably, the flexible blade is fixed to the filter carrier 3 and has an embedded end and a free projecting end, while the projection 10 is provided in the infusion head 1.

Figure 2:
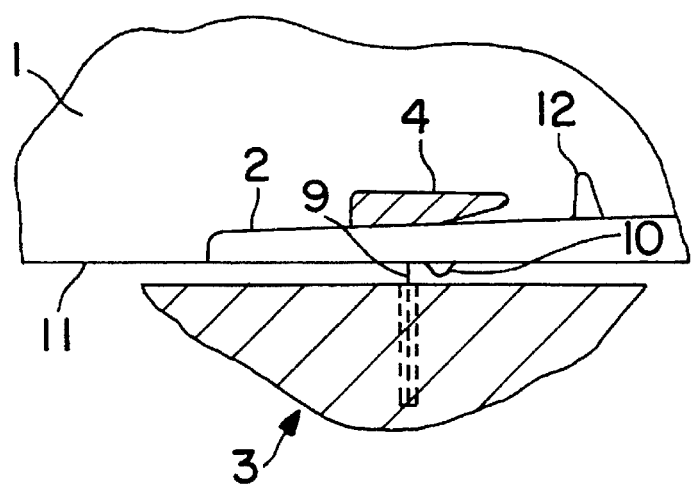
FIG. 2 is a linearly developed view in partial cross section of a detail of the embodiment of the locking device of the invention.

As can also be seen in FIG. 2, upon locking 1 the filter carrier 3, the blade 9 rides on the lower portion 11 of the infusion head and is actuated by the projection 10.

It is quite evident that in an equivalent embodiment the flexible blade could be fixed to the infusion head and the projection provided on the filter carrier.

The ramp 2 also comprises an abutment 12 against which come to bear the lugs of the filter carrier 3 if the user does not respond to the sonic signal. The relative position of the blade 9 on the filter carrier 3 and the projection 10 on the infusion head 1 is such that the blade 9 emits a sound just before the lugs come into abutment.

Preferably, the flexible blade 9 is of polyester.

According to more sophisticated versions of the invention, the indicator means comprise a switch 15 coacting with the filter carrier 3 and adapted to control the operation of an electro-acoustic or optoelectronic device.

Figure 3:
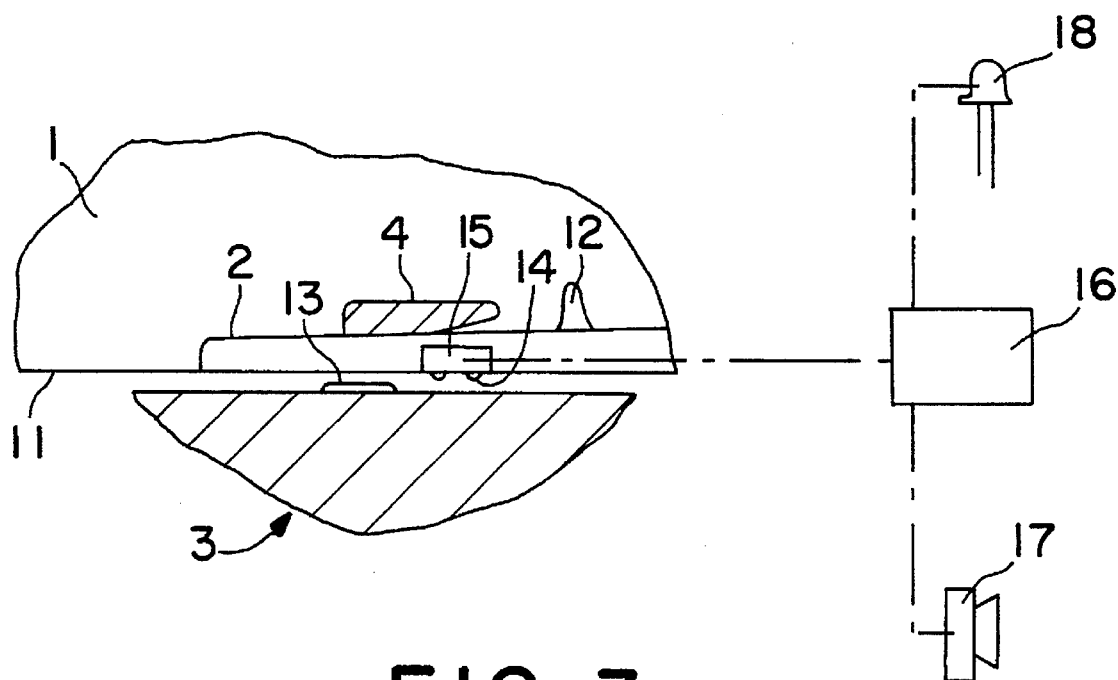
FIG. 3 is a linearly developed view and in partial cross section of a detail of the embodiment of a modification of the locking device according to the invention.

As can be seen from the modification shown in FIG. 3, the filter carrier 3 comprises a small conductive projection 13 adapted to be connected electrically to contacts 14 of switch 15 disposed in the ramp 2, when the filter carrier 3 reaches a locked position. The contacts 14 are electrically connected to an electronic interface 16 comprising as the case may be a generator of a short sound reproduced by an acoustic membrane 17, or else a diode 18 of the LED type, preferably red.

No matter what the embodiment of the invention, mechanical or electrical, it permits the user always to take account of the correct positioning and of the locking of the filter carrier and thus to impart to the coffeemaker a particularly convenient usability.

What is claimed is:

1. In a locking device for a filter carrier on an infusion head (1) of an espresso coffeemaker provided with a locking ramp (2) and adapted to receive a filter carrier (3) which comprises securement means (4) to said head (1), such that said filter carrier (3) can be engaged with the head (1) and be brought, by a movement of rotation, from a free position to a locked position; the improvement comprising sound means for indicating the passage of the filter carrier (3) from the free position to the locked position.

2. A locking device according to claim 1, wherein said sound indicating means comprise a flexible blade (9) and a projection (10) coacting with said blade (9) so as to flex the blade (9) and to permit the blade to spring back abruptly when the filter carrier (3) reaches the locked position, thereby to emit an audible signal.

3. A locking device according to claim 2, wherein the flexible blade (9) is fixed to the filter carrier (3) and the projection (10) is provided on the infusion head (1).

4. A locking device according to claim 2, wherein the flexible blade (9) is a polyester blade.

5. A locking device according to claim 1, wherein said sound indicating means comprise a switch (15) coacting with the filter carrier (3) and adapted to control the operation of an electroacoustic device (16, 17).

6. In a locking device for a filter carrier on an infusion head (1) of an espresso coffeemaker provided with a locking ramp (2) and adapted to receive a filter carrier (3) which comprises securement means (4) to said head (1), such that said filter carrier (3) can be engaged with the head (1) and be brought, by a movement of rotation, from a free position to a locked position; the improvement comprising visual means for indicating the passage of the filter carrier from the free position to the locked position, said visual indicating means comprising a switch (15) coacting with the filter carrier (3) and adapted to control the operation of an optoelectronic visualization device (16, 18).

7. A locking device according to claim 6, wherein the optoelectronic device comprises an electroluminescent diode (18).

* * * * *